Jan. 14, 1941.  J. KLOSTER  2,228,959
POPCORN MACHINE
Filed Aug. 23, 1939  2 Sheets-Sheet 2
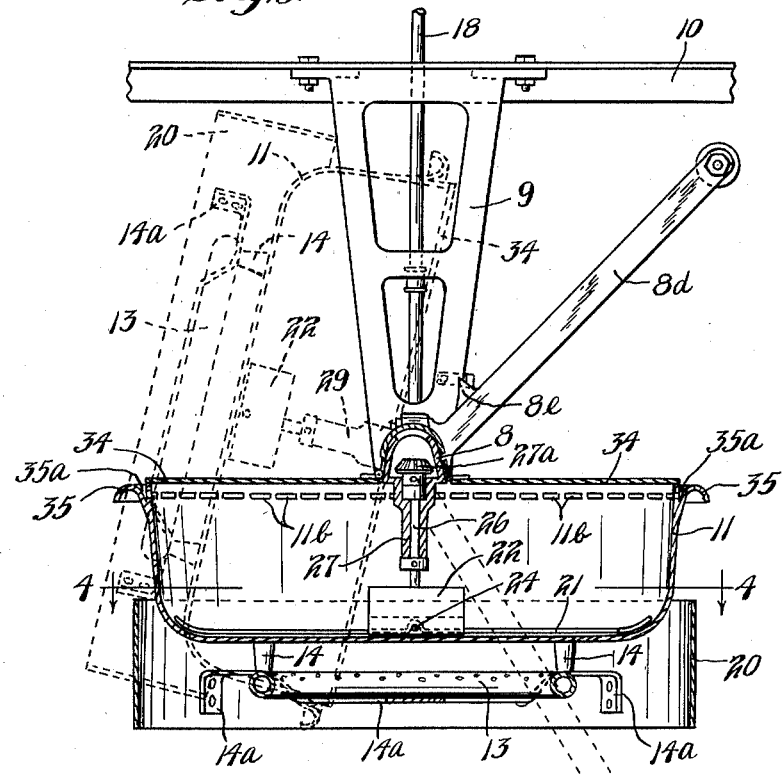
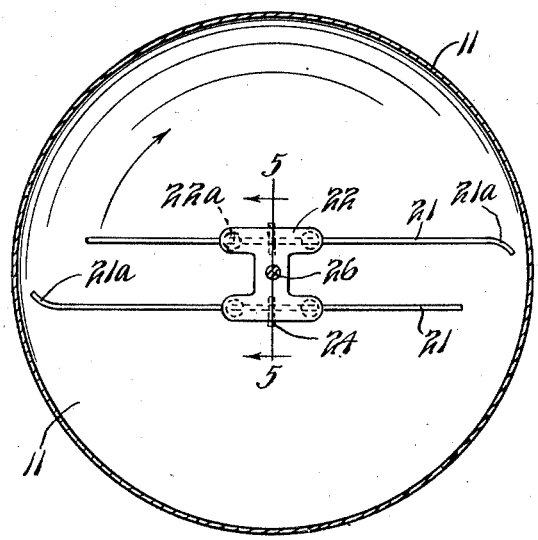
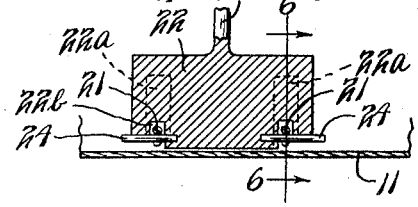
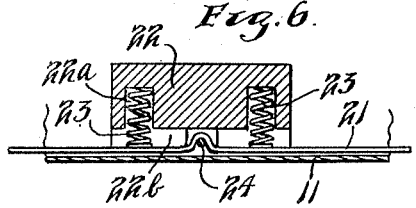
INVENTOR.
JOHN KLOSTER.
BY HIS ATTORNEYS.
Williamson & Williamson Patented Jan. 14, 1941

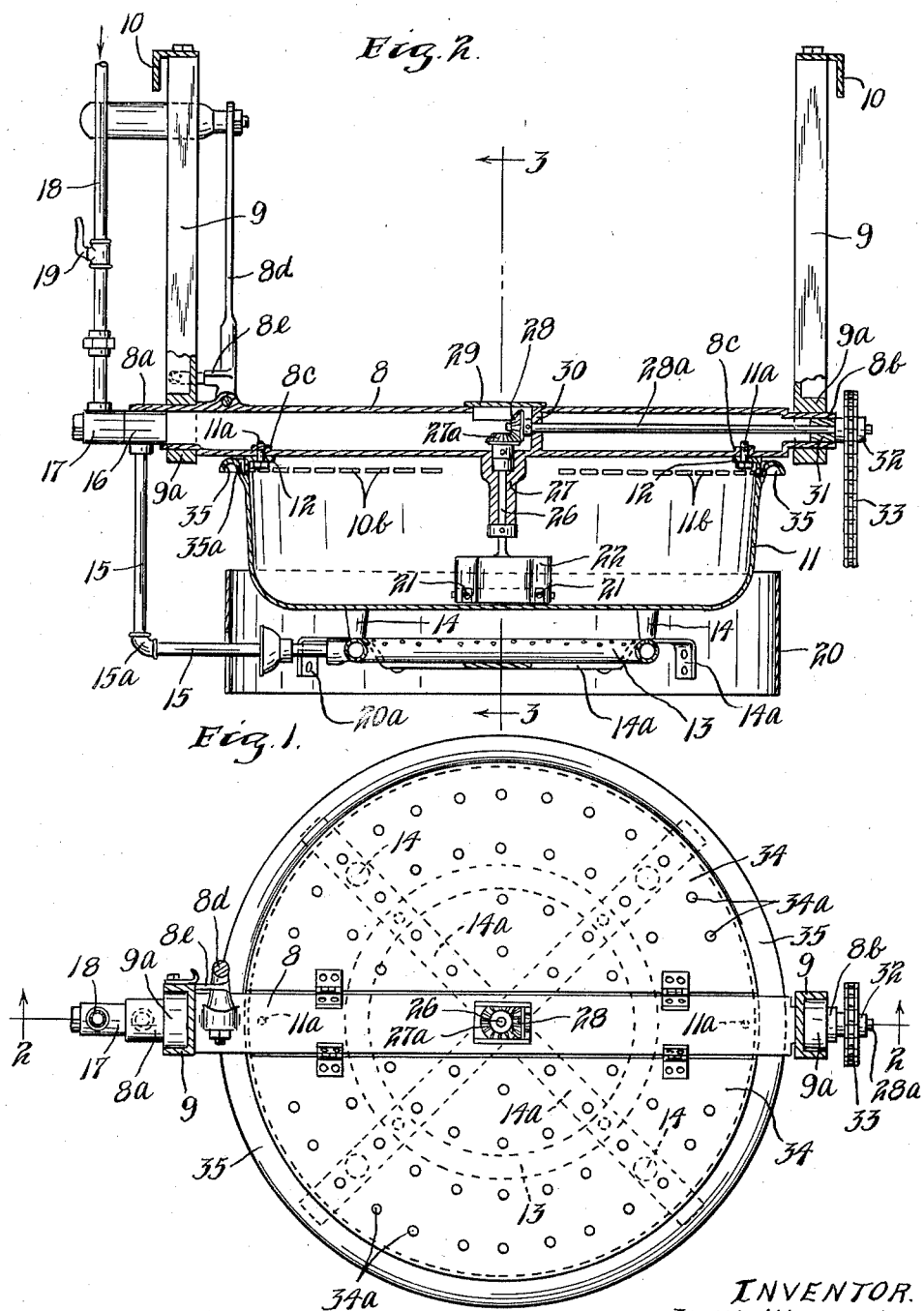

2,228,959

UNITED STATES PATENT OFFICE 2,228,959

POPCORN MACHINE

John Kloster, Minneapolis, Minn.

Application August 23, 1939, Serial No. 291,556

4 Claims. (Cl. 53—4)

This invention relates to machines for popping corn and the like and particularly to high capacity machines intended primarily for commercial use.

It is an object of my invention to provide a comparatively simple, highly efficient corn popping machine having a very high production capacity and constructed to very efficiently and uniformly pop corn.

A further object of the invention is the provision of a highly efficient commercial corn popping machine wherein the heating of the popcorn and agitation is efficiently performed to uniformly pop the corn at high speed and wherein further only a minimum amount of attention is required on the part of the operator.

More specifically it is an object to provide a machine of the class described wherein provision is made for power driving of the agitator without requiring the attention of the operator and wherein dumping or discharge of the popped corn may be quickly and easily effected by the operator without disconnection of the agitator driving means.

Still another object of the invention is the provision of a compact unitary popping machine, the essential elements of which are all supported on a mounting bar including the popping kettle, heating means and driving connections wherein the kettle heating means may be swung for discharging popcorn from the kettle without interfering with the agitator driving connections or connections for supplying the source of heat energy.

Other improvements such as the provision of highly efficient agitating means for uniformly distributing the popcorn as the kernels are heated and means for preventing overflow or dripping of the oils or butter used are also incorporated in my invention.

These and other objects and advantages of the invention will more fully appear from the following description made in connection with the accompanying drawings, wherein, like reference characters refer to the same parts throughout the views, and, in which:

Fig. 1 is a view mostly in top plan of an embodiment of my invention;

Fig. 2 is a vertical section taken substantially on the line 2—2 of Fig. 1;

Fig. 3 is a cross section taken on the line 3—3 of Fig. 2;

Fig. 4 is a horizontal section taken on the line 4—4 of Fig. 3;

Fig. 5 is an enlarged vertical section through the agitator head; and

Fig. 6 is a vertical section taken on the line 6—6 of Fig. 5.

As shown in the drawings the main parts and element of my device are connected with and supported from a horizontally disposed oscillatory mounting bar 8 of tubular construction. The mounting bar 8 is suitably journalled adjacent its ends. As shown a pair of depending triangular supporting brackets 9 secured to overhead angle bars 10 are provided, said brackets having bearings 9a formed in the lower portions thereof. Bar 8 is provided at its ends with somewhat diminished trunnions 8a and 8b respectively which are journalled in bearings 9a. Below the bar 8 a popping kettle or pan 11 is secured by suitable means such as bolts 11a which pass through inturned attachment lugs 12 at the top of the kettle 11, and which are threaded into bosses 8c formed in the lower portion of the mounting bar 8. Kettle 11 has preferably a flat bottom upon which the corn to be popped is distributed.

To effect substantially uniform heating on the bottom of kettle 11, I provide an annular heating element 13, which as shown is in the form of a gas burner supported concentrically of and just below the bottom of the kettle 11 by suitable means such as depending lugs 14 to which the annular burner is secured by attachment strips 14a. It will, of course, be understood that electrical or other heating means may be substituted for the heating means 13. The kettle 11 and gas burner 13, of course, may be swung or rocked with the mounting bar 8 and gas supply connections are provided to this, and, as shown, a gas supply pipe 15 having an elbow 15a therein connects at its upper end with a suitable gas fitting 16 mounted in the outer extremity of the mounting bar 8. To facilitate such connection the lower portion of the tubular mounting bar is slotted on its underside a sufficient distance to expose the fitting 16 for connection with the upper end of pipe 15. Fitting 16 is swivelly connected with a stationary fitting 17 which has connected therewith the gas supply pipe 18 supported some above the device and, as shown, equipped with a regulating valve 19.

The orifices of the annular burner 13 are preferably slotted in such manner as to distribute the jet flames radially for as wide a distance as possible against the bottom of the kettle. A shield in the form of an annular skirt 20 may be provided about the burner 13 and bottom portion of the kettle spaced therefrom and, as shown, supported by suitable means such as the hanger strips 14a to which the lugs 14 are secured.

The mounting bar 8 is provided with radially extending operating arm 8d having a horizontal handle at the outer end thereof, and a stop or abutment 8e is provided adjacent the connected end of the operating arm 8d adapted to abut against one side of the adjacent supporting bracket 9 to limit the upward swinging movement of the operating arm and upward rocking movement of the mounting bar 8. Mounting bar, kettle 11 and associated parts are so balanced that the weight will be distributed to cause the kettle and burner to normally be disposed in horizontal position.

Within kettle 11 and at the bottom thereof I provide a highly efficient pair of agitators 21 as shown in the form of rods disposed in parallel relationship, each of said rods conforming to the shape of the bottom and having one of its ends bent laterally at 21a towards the direction of rotation of the agitator, said end of said rod from the attached center thereof being somewhat longer than the opposite end, whereby the two rods when they revolve in unison will pick up and cause an inward distribution or movement of the popcorn or kernels of corn to be popped toward the center of the kettle while at their shorter ends the movement of the corn and kernels will be centrifugal and outwardly. The rods 21 are detachably connected to a head 22 for limited yielding movement away from the bottom of the kettle with which they are normally in close engagement. As shown, the head 22 is of general I-shape in plan and having two series of spring sockets 22a therein, formed by drilling the lower side thereof, said sockets accommodating coil springs 23 which bear downwardly against the rods 21. Each rod, as shown in Fig. 6, has an inverted U-shaped central attachment portion which is loosely pivoted by a pin 24 within a slot 22b formed in the bottom portion of the head and running in each instance parallel of the base and top of the I-shaped head, one slot being provided for each rod. Slots 22b are of a height slightly greater than the thickness of the rod and central U-shaped attachment portion in order that the rods may be detached from the head for cleaning without releasing the driving connections of the head. This is accomplished by removing the pin 24 and sliding the short straight ends of the rods 21 outwardly toward the side of the kettle 11. When the rod has been moved in this direction sufficiently for the U-shaped central bend in the rod to clear the ends of the slot 22b in the head, the rod can then be slipped from beneath the head laterally. It should be noted that when the rod is in operating position upon the pin 24, it is held above the lateral bottom portions of the head and its twisting movement is, therefore, limited. The springs 23 do not interfere with this sliding movement of the rod since they are relatively light and the U-shaped portion of the rod can push past the springs or force them up again.

The head 22 is rotatably driven by suitable driving connections which permit the mounting bar and kettle to be swung for dumping popped corn without requiring disconnection or detachment of the driving means and its connections. To this end is shown a vertical driving shaft 26 journalled in an elongated vertically disposed depending bearing 27, said shaft being secured at its lower end to head 22, the bushing or bearing 27 being affixed to the lower and central portion of the mounting bar 8 and shaft 26 extending into said mounting and carrying on its upper end a bevel gear 27a which is in mesh with a bevel gear 28 affixed to the inner end of a horizontal shaft 28a axially disposed within the tubular mounting bar 8. An opening is formed in the upper portion of the tubular bar 8 through which the gears 27a and 28 may be meshed and this opening is shown closed by a cap or plate 29. Shaft 28a is journalled in suitable bearings 30 and 31 secured within the mounting bar 8 and said shaft extends through the bearing 31 and has affixed to its outer end a sprocket 32 about which is shown a driving chain 33, which is in turn connected to a suitable means of driving power not shown. From the driving connections described it will be obvious that the mounting bar, kettle and gas burner may be swung without disconnecting or effecting driving engagement. Sectional hinged covers 34 are provided for the kettle, the straight inner edges of said covers being suitably hinged to the mounting bar 8 and preferably each having a multiplicity of small apertures 34a therein to permit moisture vapors from gases to escape during the popping process.

To prevent dripping of the melted butter and oils used for flavoring the popcorn under the exterior wall of the kettle particularly during the dumping of the popcorn, I provide an outturned drip flange 35 surrounding the upper edge of the kettle and diverging therefrom. This annular flange it will be noted is rolled or bent to form a curve or trough 35a in conjunction with the exterior peripheral wall of the kettle and this wall at substantially the bottom of the trough is provided with a multiplicity of overflow return ports 11 which cause oil and butter caught by the trough in overflow during dumping or otherwise to be returned to the interior of the kettle. Any oil or butter which actually overflows the trough during the dumping action will not drip upon the peripheral wall of the kettle and carbonize, but will fall free of the peripheral wall.

In operation, with the kettle disposed in its normal horizontal position and with the flame from the gas burner playing uniformly against a relatively large annular portion of the bottom of the kettle, corn to be popped is poured into the kettle by opening one of the hinged cover sections 34. A relatively large quantity of corn may be popped at one time because of the efficient agitation and equalized heating means of my device. The kernels to be popped are moved by the two agitator rods working back and forth from the center of the kettle to the peripheral wall and from the peripheral wall inwardly as has been previously described. Such an agitation produces a substantially uniform heating of the corn, particularly in view of the efficient distribution of heat against the bottom of the kettle. Unpopped kernels or small fragments cannot be wedged between the agitators and against the bottom of the kettle since the agitator rods 21 may yield against the action of the springs 23 thereby permitting release of such kernels or fragments. Butter or oil may be readily distributed over the popping corn by lifting one of the hinged cover sections. When the corn within the kettle is completely popped, which incidentally requires only a relatively short time, the mounting bar 8 may be rocked by swinging the operating arm 8d and the contents dumped on a screen container or the like. In such dumping action as has been stated the viscous oil or butter will not drip upon the exterior of the kettle. It will be caught by the trough 35a and subsequently returned.

It will, of course, be understood that various changes may be made in the form, details, arrangement and proportions of the various parts without departing from the scope of my invention.

What is claimed is:

1. In a corn popping machine, a popping kettle, means for heating the bottom of said kettle, a rotary agitator mounted within said kettle over the bottom thereof, driving connections for said agitator, said agitator comprising a bar disposed substantially diametrically across the bottom of said kettle, said bar being bodily yieldable in an upward direction, one end of said bar terminating in an extremity bent toward the direction of rotation for working material inwardly towards the center of said kettle, the other end of said bar being adapted to work material outwardly from the center of said kettle.

2. In a corn popping machine, a popping kettle, means for heating the bottom of said kettle, a rotary agitator mounted within said kettle over the bottom thereof, driving connections for said agitator, said agitator comprising a pair of parallel bars extending substantially diametrically across the bottom of said kettle and spaced outwardly from the axis of said agitator, one end of each of said bars being somewhat longer than the opposite end thereof and having its extremity bent towards the direction of rotation of said agitator for engaging and working material inwardly towards the center of said kettle.

3. In a corn popping machine, a popping kettle, means for heating the bottom of said kettle, a rotary agitator mounted within said kettle, said agitator having a bar retaining head disposed above the bottom of said kettle and an agitator bar disposed substantially diametrically across the bottom of said kettle, said head having a receiving slot for said agitator bar, and resilient means interposed between said bar and a portion of said head for rendering said bar bodily yieldable in an upward direction.

4. The structure set forth in claim 3, and said bar having an upwardly extending loop at its central portion, the slotted portion of said head having a pin disposed beneath said loop for securing said bar against endwise displacement.

JOHN KLOSTER.